United States Patent
Gove et al.

(10) Patent No.: US 6,232,936 B1
(45) Date of Patent: May 15, 2001

(54) DMD ARCHITECTURE TO IMPROVE HORIZONTAL RESOLUTION

(75) Inventors: Robert J. Gove, Los Gatos, CA (US); Jeffrey B. Sampsell, Vancouver, WA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/415,101

(22) Filed: Mar. 31, 1995

Related U.S. Application Data

(63) Continuation of application No. 08/161,832, filed on Dec. 3, 1993, now abandoned.

(51) Int. Cl.[7] .................................................. G09G 3/34
(52) U.S. Cl. .................... 345/85; 340/815.04; 359/317
(58) Field of Search ................... 345/85, 108; 346/160; 359/230; 430/321; 348/750, 755; 340/815.04

(56) References Cited

U.S. PATENT DOCUMENTS

| | | |
|---|---|---|
| 5,028,939 | 7/1991 | Hornbeck et al. . |
| 5,061,049 | 10/1991 | Hornbeck . |
| 5,146,356 | 9/1992 | Carlson . |
| 5,240,818 * | 8/1993 | Mignardi et al. .................... 430/321 |
| 5,280,277 * | 1/1994 | Hornbeck ............................. 345/108 |

* cited by examiner

Primary Examiner—Amare Mengistu
(74) Attorney, Agent, or Firm—Charles A. Brill; Wade James Brady, III; Frederick J. Telecky, Jr.

(57) ABSTRACT

A method and device for increasing the effective horizontal resolution of a display device. One embodiment forms a cardinal array of digital micromirror elements by staggering alternate rows in an array. According to a second embodiment, an ordinal pixel array 57, is converted to a cardinal pixel array, by grouping SLM elements 59, 61, 63, and 65 into a pixel block 58. All of the elements in a pixel block are controlled in unison such that the pixel block acts like a single pixel. Rows of pixel blocks 67 and 69 are offset to provide the effect of a cardinal array of pixels without the decrease in efficiency sometimes associated with cardinal pixel arrays.

20 Claims, 8 Drawing Sheets

DMD ARCHITECTURE TO IMPROVE HORIZONTAL RESOLUTION

This application is a Continuation of application Ser. No. 08/161,832, filed Dec. 3, 1993, now abandoned.

This application is related to U.S. Pat. No. 4,956,619, issued Sep. 11, 1990 and U.S. Pat. No. 5,061,049, issued Oct. 29, 1991.

1. Field of the Invention

This invention relates to the field of projection display systems, more particularly to digital spatial light modulator projection display systems.

2. Background of the Invention

Spatial light modulators (SLM) may be used in projection display systems to create images. One of the primary display system performance metrics is resolution. Resolution is measured in lines per inch both vertically and horizontally. Because of the signal format of television and other video signals, vertical resolution is equal to the number of lines transmitted by the video source. Horizontal resolution is a more subjective measurement. If the video signal is digitized for display, the horizontal resolution is determined by the number of digitized video samples that can be displayed on each line of the video image.

Horizontal resolution specification is further complicated by the issue of effective or useful resolution. Visually disturbing effects can result when an image is displayed that uses the maximum horizontal resolution of the display system. If an image with vertical stripes that require the maximum horizontal resolution of the display moves horizontally and changes alignment with the pixels, the displayed image will appear to change very rapidly. This is caused by the phase shift between the video signal and the video sampling.

For example, as shown in FIGS. 1 and 2, if the triangle wave video signal represents an image of vertical black and white stripes at the horizontal resolution capability of the display, and the image is sampled at the points indicated by tick marks on the x-axis, each row of the displayed image will consist of alternating black and white pixels, as shown in FIG. 2. If, as shown in FIG. 3, the phase of the input video signal changes, representing the image moving horizontally one-half pixel, the resulting image will be an entire row of gray pixels, as shown in FIG. 4. As this image continues to move, the viewer will not see a moving field of stripes but a screen that alternates between high contrast stripes and gray. To eliminate this problem, video signals may be filtered to eliminate the high frequency components. The filter is usually designed to pass signals with horizontal resolution up to seventy percent of the maximum capability of the display screen. While this method eliminates the problems associated with displaying an image with high horizontal resolution, it does so by eliminating the high horizontal resolution signal components thereby lowering the resolution of the image.

SUMMARY OF THE INVENTION

It is an object of the invention to provide an efficient SLM array architecture that increases the effective resolution of the display without reducing modulator efficiency. One embodiment of this invention staggers the rows of an SLM array to form a cardinal array. Another embodiment of this invention groups SLM elements from an ordinal array to form picture elements in cardinal format. Grouping may be accomplished by either physically connecting the control signals of the SLM elements, or by operating SLM elements in unison using independent control means for each element. Cardinal grouping of ordinal pixels avoids the efficiency problems that occur with some SLM technologies when using cardinal arrays.

It is a further advantage of the present invention to allow for redundancy in pixel addressing. It is still a further advantage of the present invention that it allows for increased display brightness.

DETAILED DESCRIPTION OF THE PREFERRED EMBODIMENTS

Figure 2:
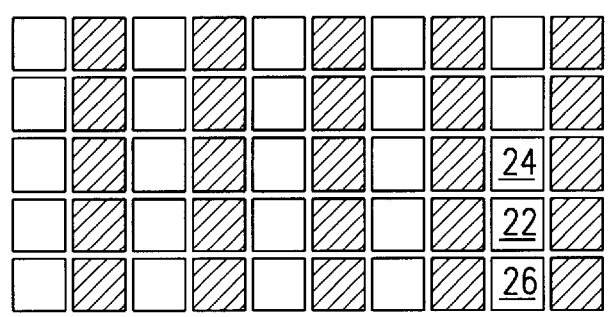
FIG. 2 is a plan view of an ordinal array of picture elements displaying alternate light and dark stripes.
Figure 3:
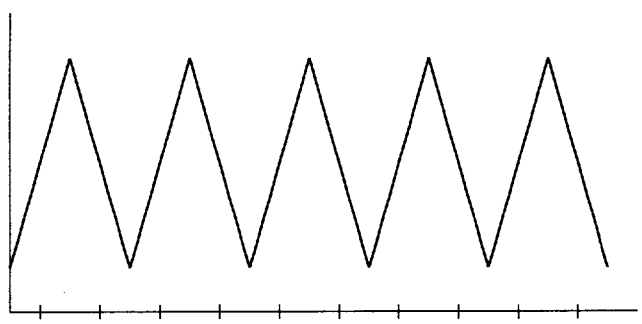
FIG. 3 is a waveform showing a triangle wave video signal.
Figure 6:
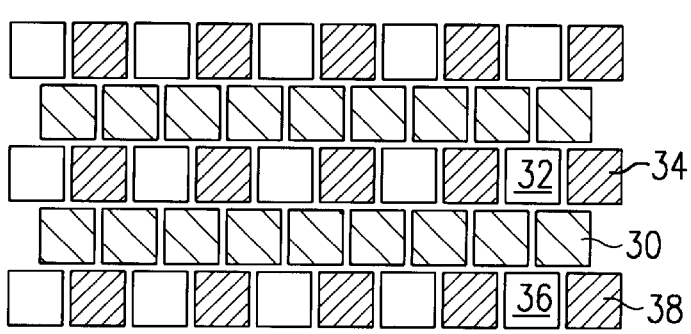
FIG. 6 is a plan view of a cardinal array of picture elements displaying rows of light and dark elements alternating with rows of grey elements.

FIG. 2 shows an area array 20, comprised of square pixels arranged in ordinal format. Ordinal format means that the rows of pixels are arranged directly beneath adjacent rows. This results in pixel 22 being directly below pixel 24 and directly above pixel 26. FIG. 6 shows an area array 28, comprised of square pixels arranged in staggered format. Staggered format results in a pixel 30 being between pixels 32 and 34 on the row above and between pixels 36 and 38 on the row below. Cardinal and brick format are alternate terms for staggered format. A cardinal array may be used to display a high resolution signal without some of the artifacts created by an ordinal array.

Figure 1:
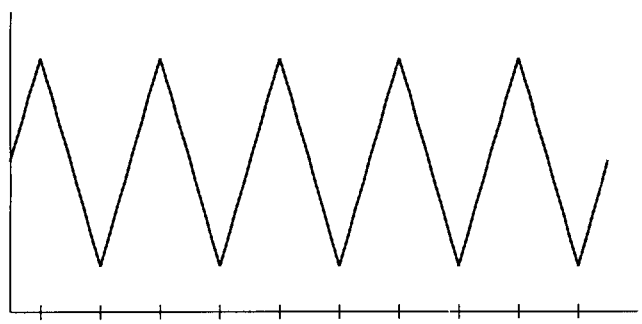
FIG. 1 is a waveform showing a triangle wave video signal.
Figure 5:
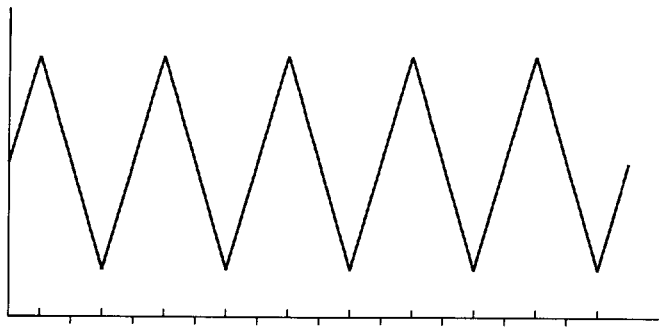
FIG. 5 is a waveform showing a triangle wave video signal.
Figure 7:
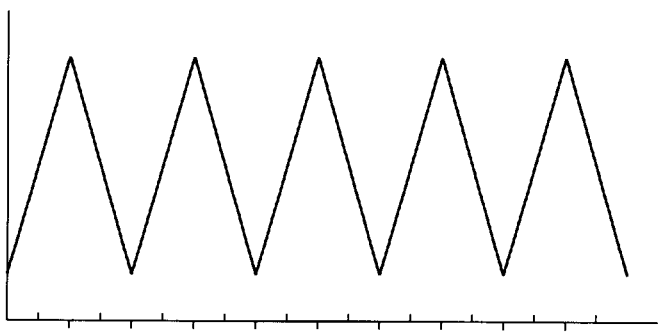
FIG. 7 is a waveform showing a triangle wave video signal.
Figure 8:
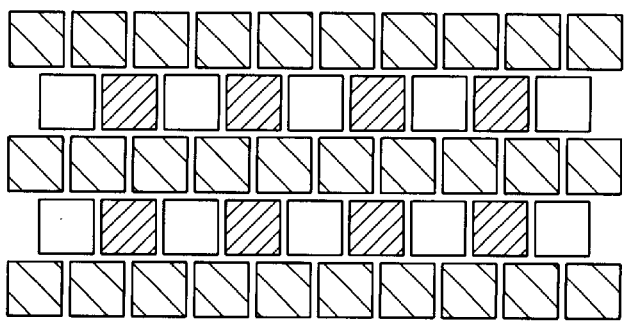
FIG. 8 is a plan view of a cardinal array of picture elements displaying rows of grey elements alternating with rows of light and dark elements.

FIGS. 5 and 6 show the high resolution stripe example of FIGS. 1 and 2 using staggered pixels. The odd rows of FIG. 6 display data that is sampled at the time shown by the tick marks above the x-axis of FIG. 5. This results in all odd rows consisting of alternating black and white pixels. All even rows display data that is sampled at the time shown by the tick marks below the x-axis of FIG. 5. This results in all even rows displaying grey. The eye integrates this display of stripes on a gray background and perceives stripes of decreased dynamic range. As the image alignment shifts, as shown in FIGS. 7 and 8, the alternate gray rows will begin to display stripes as the striped rows begin to display gray. The viewer will again see this as stripes on a gray background. As the image moves across the display, the viewer sees the intended image but with reduced dynamic range.

Although staggered pixels allow high resolution video images to be displayed without the loss in horizontal resolution that occurs when the signal is filtered, staggered pixels may reduce the vertical resolution of the display. Because horizontal resolution typically is more important than vertical resolution, trading vertical resolution for horizontal resolution is often desirable. The amount of vertical resolution sacrificed depends on the sampling and image processing algorithms implemented.

Figure 4:
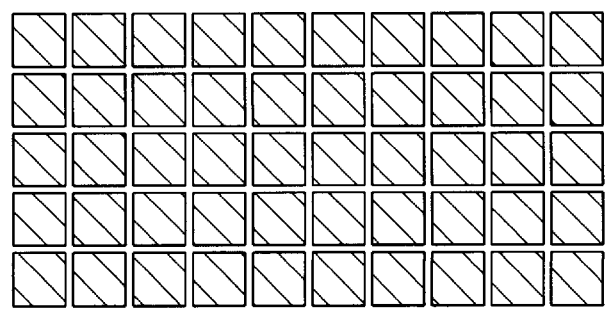
FIG. 4 is a plan view of an ordinal array of picture elements displaying a grey field.
Figure 9:
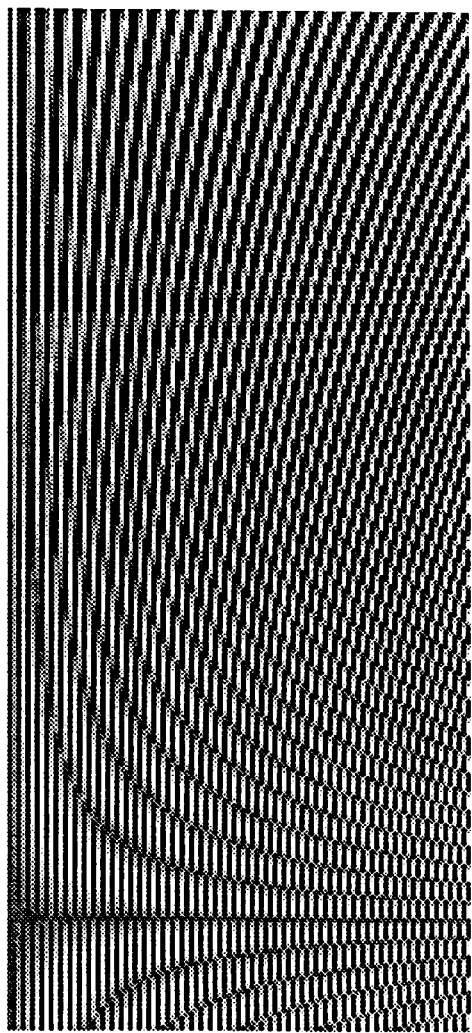
FIG. 9 is a display of vertical bars of a first phase using an ordinal array of pixels.
Figure 10:
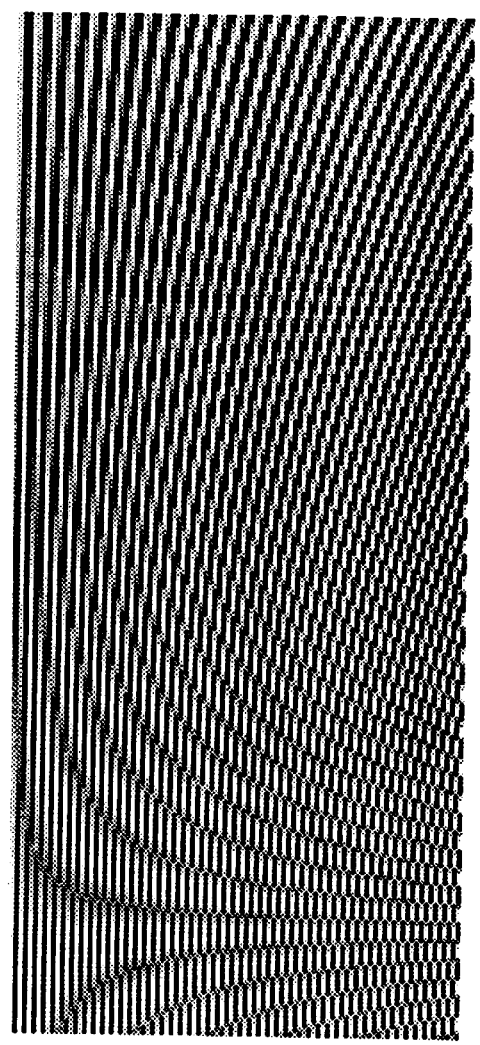
FIG. 10 is a display of vertical bars of a second phase using an ordinal array of pixels.
Figure 11:
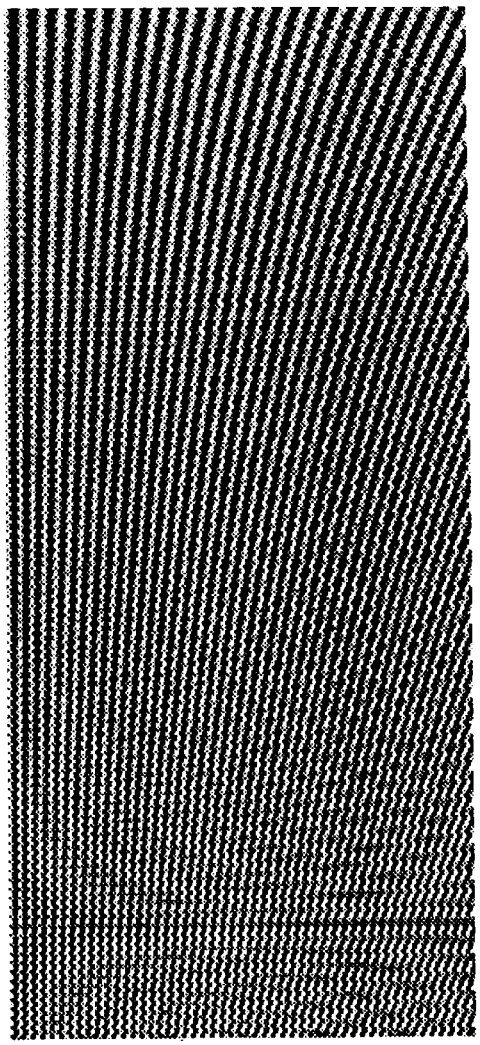
FIG. 11 is a display of vertical bars of a first phase using a cardinal array of pixels.
Figure 12:
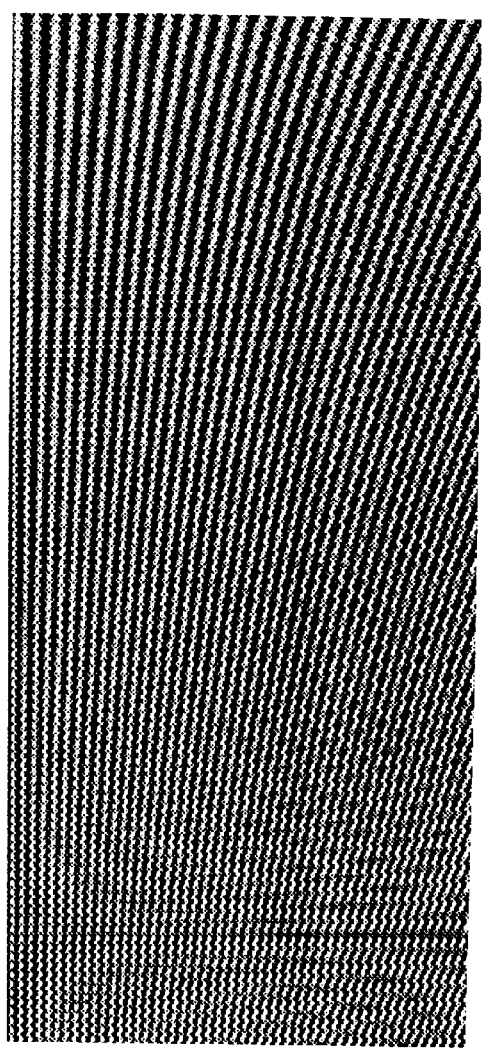
FIG. 12 is a display of vertical bars of a second phase using a cardinal array of pixels.

FIGS. 9, 10, 11, and 12 show the artifacts created when displaying images with strong vertical patterns. The vertical bars in each figure become thinner and closer together as they progress from top to bottom. As the bars are compressed, the horizontal resolution required to display the bars becomes progressively higher. In FIGS. 9 and 10, the bars are displayed using an ordinal pixel array. FIG. 10 shows the image of FIG. 9 shifted in phase. This phase shift is similar to the phase shift between FIGS. 2 and 4. FIGS. 11 and 12 show the same images and phase shift as FIGS. 9 and 10 except that FIGS. 11 and 12 use a cardinal array of display pixels. It can be seen from FIGS. 9 through 12 that a cardinal array does reduce some of the artifacts created when displaying an image that requires a display with a high horizontal resolution.

Figure 13:
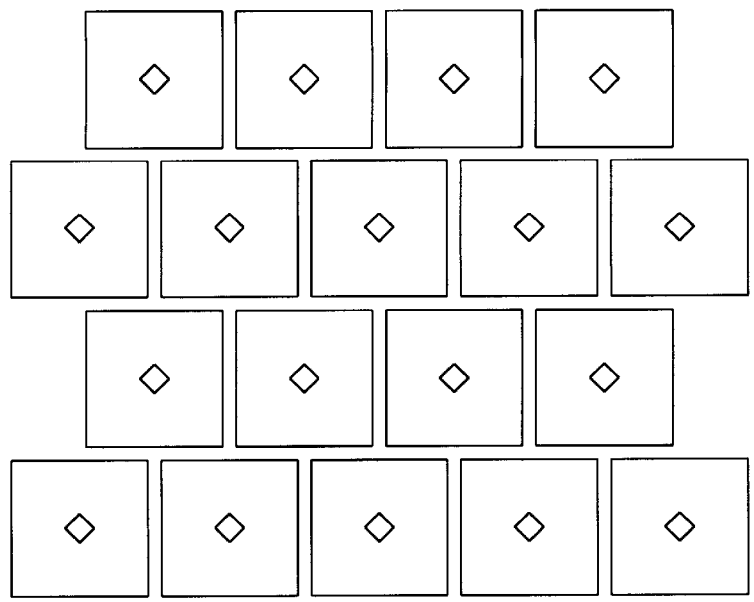
FIG. 13 is a plan view of a portion of a cardinal array of hidden hinge torsion beam digital micromirror devices.

At least four architectures are currently used in fabricating digital micromirror devices (DMDs). These include the torsion beam, the cantilever beam, the flexure beam, and the hidden hinge torsion beam. The hidden hinge torsion beam DMD is taught in U.S. Pat. No. 5,083,857, "Multi-level Deformable Mirror Device", issued Jan. 28, 1992, which is incorporated herein by reference. A cardinal array of hidden hinge torsion beam DMDs according to one embodiment of the disclosed invention is shown in FIG. 13.

Figure 14:
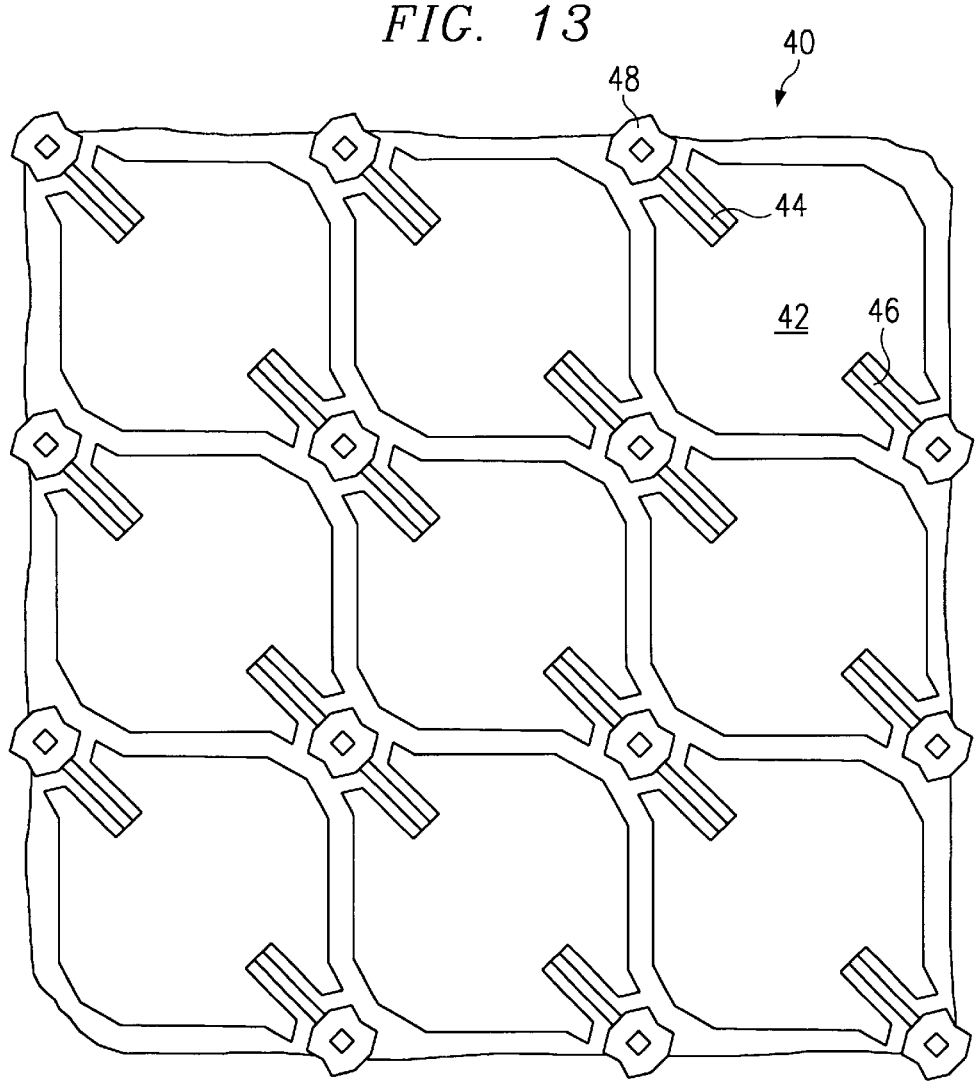
FIG. 14 is a plan view of an ordinal array of digital micromirror devices.

Staggered pixels do not work well for all types of spatial light modulators. For example, displays using torsion beam DMDs, are less efficient when staggered pixels are used because of the mechanical structures required to support the mirrors. In one embodiment of the invention, the torsion beam DMD is used. Any spatial light modulator could be used, but for the purposes of discussion, the focus will be on the torsion beam DMD. FIG. 14 shows a plan view of a portion of a torsion beam DMD array 40. Each torsion beam DMD element consists of a mirror 42 supported over an air gap by two torsion hinges 44 and 46. The hinges are anchored to a supporting structure. In this case the supporting structure is an array of metalized via support posts 48. Except for around the edges of the array, each support post 48 is shared by torsion hinges from two DMD elements.

Figure 15:
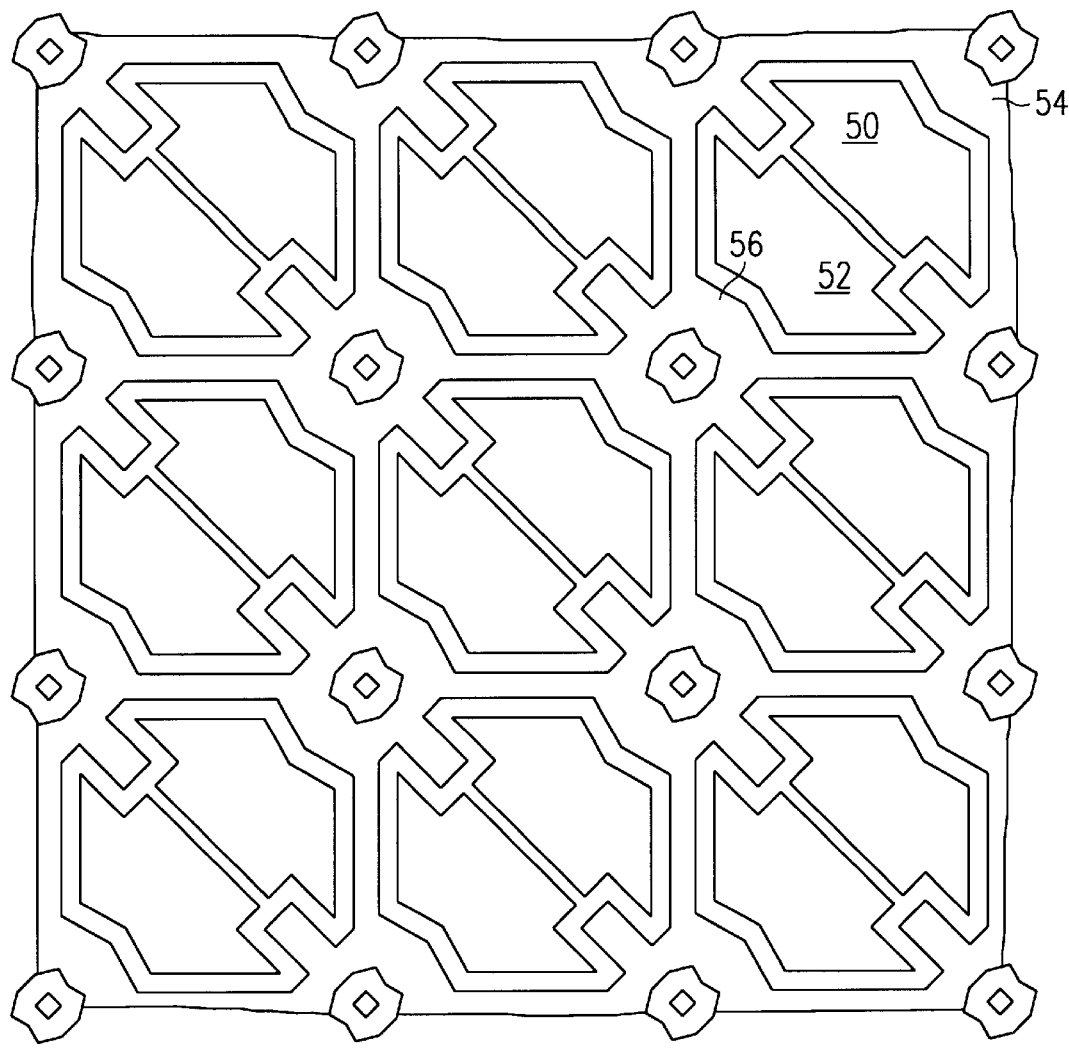
FIG. 15 is a plan view of an ordinal array of digital micromirror devices with the mirrors and hinges removed to show the underlying electrodes.

FIG. 15 is the portion of a torsion beam DMD array from FIG. 14 with the hinges and mirrors removed from each element to show the underlying electrodes. A pair of address electrodes 50 and 52 is formed under each mirror centered about the hinge axis. A bias bus is also patterned on the metal layer underneath the DMD mirrors. The bias bus is electrically connected to the mirrors and is used to supply a bias voltage to all of the mirrors, or a group of mirrors during the operation of the DMD. The bias bus also defines two landing sites 54 and 56.

Display data is written into a memory cell connected to the address electrodes. Depending on the display data, the memory cell applies a voltage to one of the address electrodes. The voltage causes an electrostatic force which attracts the mirror suspended above it. A bias may also be applied to the mirror to increase the attraction. The attraction between the address electrodes and the mirror causes the mirror 42, to rotate about the hinge axis. If the attraction is great enough, the mirror will rotate until the tip touches one of the landing sites 54 or 56. In an optical system, the DMDs are configured as an area array of pixels, and the pixels that are to be ON are turned to one side of the hinge axis, and those that are OFF are turned the opposite direction. Details of such a device can be found in U.S. Pat. No. 4,956,619, "Spatial Light Modulator", and U.S. Pat. No. 5,061,049, "Spatial Light Modulator and Method", both assigned to Texas Instruments Inc., which are incorporated by reference herein.

Figure 16:
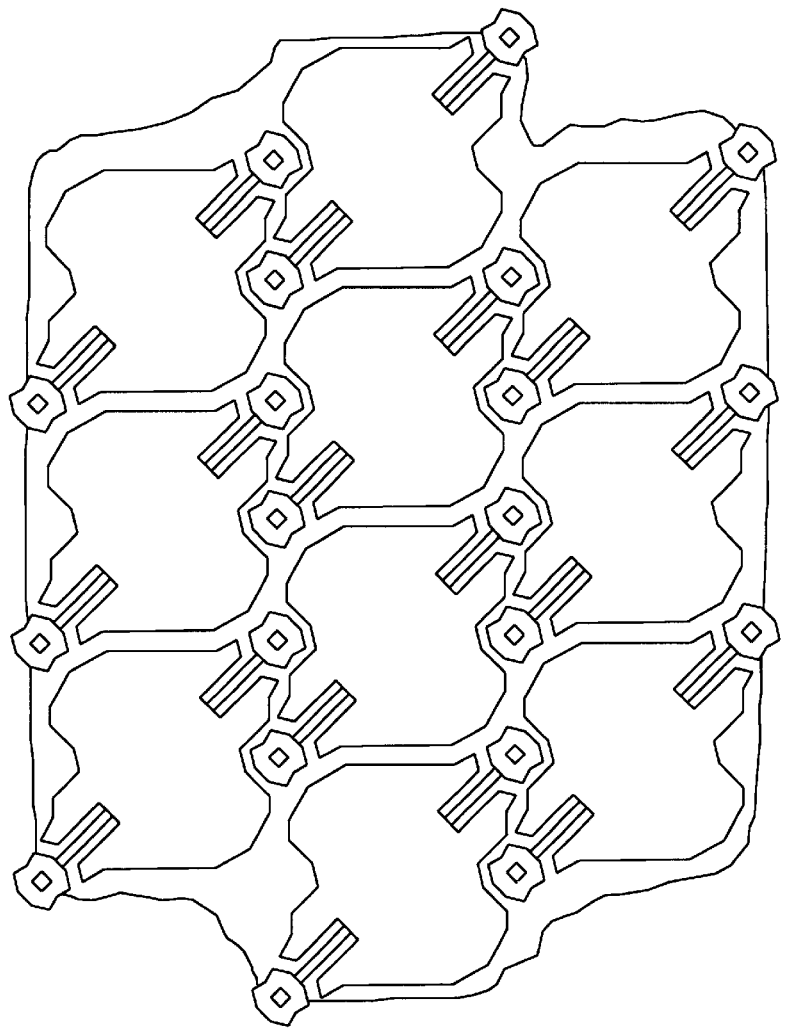
FIG. 16 is a plan view of a cardinal or staggered array of digital micromirror devices.

FIG. 16 shows a plan view of an area array of torsion beam DMD pixels with staggered pixels as was shown in FIGS. 6 and 8. When alternate rows of pixels are shifted to form a cardinal array, the adjacent pixels can no longer share supporting posts. Additional support posts are required resulting in a decrease in the usable mirror area. Not only does the usable mirror area decrease, but the additional support posts reflect light causing a decrease in the contrast ratio of the image produced. In practice the reduction in mirror area is about twenty percent and contributes directly to a drop in display system efficiency.

Figure 17:
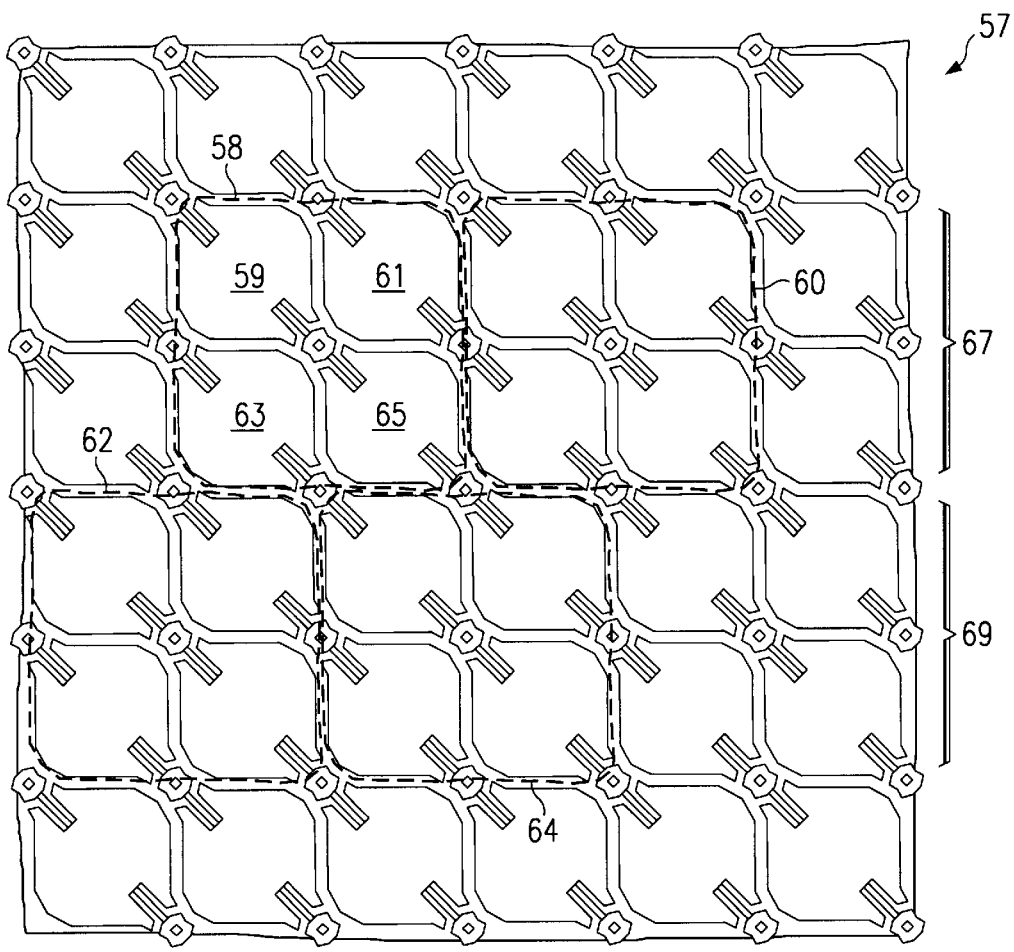
FIG. 17 is a plan view of an ordinal array of digital micromirror devices with staggered grouping.

The claimed invention is apparently the first solution to address the aforementioned problem of reduced efficiency caused by staggered pixels. In one embodiment of the invention, shown in FIG. 17, the number of modulator elements in each of the two dimensions of an area array is doubled. These elements are grouped to form sub-arrays or pixel blocks 58, 60, 62, and 64, as shown by the dashed lines in FIG. 17, comprised of four modulator elements. The term 'pixel block' is used because the term 'pixel' is usually defined as the smallest individually controllable picture element and, although each of the modulator elements in a pixel block acts in unison, various embodiments of this invention have the capability to separately control the individual modulator elements within a pixel block. The pixel blocks are arranged in rows with the pixel blocks of one row centered between adjacent pixel blocks of the row above or below it. The net effect is the creation of staggered pixels without the reduced efficiency described above.

Although the above embodiment of the invention used a 2×2 array of modulator elements for each pixel, various embodiments of the invention could use varying numbers and arrangements of modulator elements. For example, each pixel could be comprised of a 1×2, 2×3, 3×2, 3×3 or any other size array of modulator elements. The possibilities are limited only by the physical size constraints of the modulator.

The invention may be implemented by either connecting each modulator element to the same control signals so that each element in a group is written to at once and receives common data, or by individually writing common data to each element.

Because the number of elements in the modulator array is increased, the array designer may use smaller elements in order to keep the array the same size, or use the same size elements and allow the array size to increase. Each modulator technology has tradeoffs that affect element and array size. With digital micromirror devices, the size of the mirror and the distance between the mirror and the substrate determine the angular defection of the mirror in operation. The mirror size is also limited by the need to etch away the photoresist from the air gap. These constraints limit the maximum size of each mirror. The minimum mirror size is limited by the need to construct addressing and landing electrodes beneath the mirrors.

An additional advantage achieved with a larger array size is increased image brightness. Because of the small size typically associated with digital micro-mirror device elements and the finite resolution of a typical video signal, DMD arrays are typically quite small. As the size of each pixel is increased by grouping more than one modulator element into a pixel block, the size of the DMD is increased. This increase in size allows the use of more efficient optics and results in a brighter image display.

A further advantage of the invention is the capability of building redundant addressing circuitry without requiring increased element size. If the modulator elements in a pixel block are electrically connected, only one address circuit must be constructed for each pixel block. In practice there is often enough room to construct a second address circuit for each pixel block. The second address circuit forms a backup that can be selected during die testing if there is an error in the primary address circuit.

Figure 18:
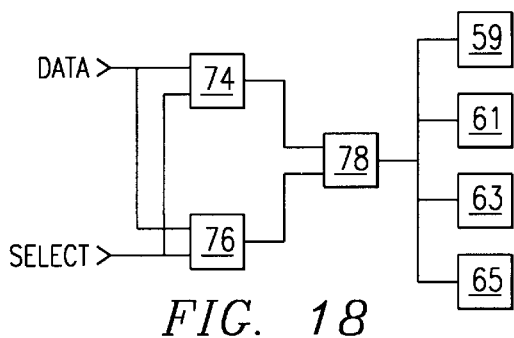
FIG. 18 is a schematic view of one redundant addressing scheme.

A schematic view of one embodiment of a redundant addressing scheme is shown in FIG. 18. As shown in FIG. 18, all four DMD elements, 59, 61, 63, and 65, in a pixel block are electrically connected. Either of two memory cells 74 and 76 may be selected by multiplexer 78 and used to bias the four DMD elements. If a flaw causes memory cell 74 to fail, multiplexer 78 could select memory cell 76. An alternative to multiplexer 78 is simply to connect the output of both memory cells to the DMD elements and fuse one of the outputs during device testing. Some flaws can cause failures that thwart the use of the redundant address circuitry shown in FIG. 18. To overcome such failures many schemes can be used that are known in other art fields such as integrated circuit memory fabrication. One such scheme involves the use of pass transistors to isolate failed transistors. Such schemes usually involve tradeoffs between device complexity, with its increasing probability of faults, and the ability to survive faults.

Figure 19:
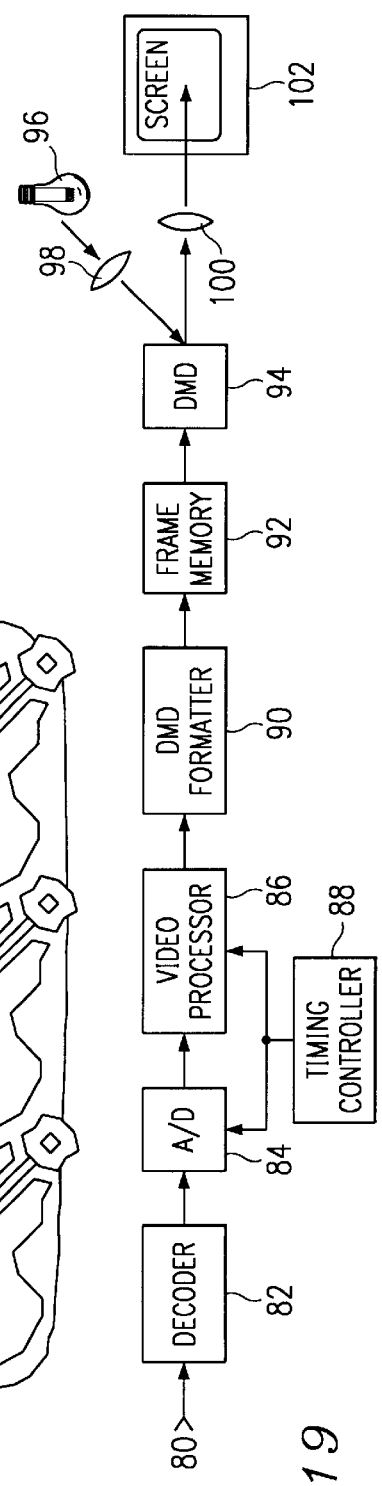
FIG. 19 is a block diagram of one embodiment of a DMD based television display system.

A typical application for staggered pixels is a television display system is shown in FIG. 19. In FIG. 19, a composite video signal is input on signal 80. Decoder 82 downconverts the composite video signal to enable it to be sampled and digitized by the analog to digital converter (A/D) 84. The digitized video signal is input to the video processor 86 where various data manipulations, such as a progressive scan conversion, are performed. Timing controller 88 synchronizes the operation of the A/D 84 and video processor 86. DMD formatter 90 reformats the data to be compatible with the input format required by a DMD, and frame memory 92 stores the reformatted data until the DMD 94 is ready to display it. Light from light source 96 is focused onto DMD 94 by source optics 98. The light is reflected by the reflective surface of the DMD 94 and is focused by projection optics 100 onto a display screen 102 where the resulting image is viewed.

Depending on the functions performed by the video processor 86, the input video source may have any one of various image formats regardless of the display format chosen. For example, the input video data may have a 60 Hz frame rate with each frame consisting of 240 lines of 640 pixels. Each alternate frame may consist of only the even or odd line information. The video processor could convert this image data to a data stream having a 60 Hz frame rate with each frame consisting of 480 lines of 640 pixels wherein each frame has information for both the odd and even rows. There are several algorithms available to perform the necessary image conversions. It should be noted that if the output image makes use of staggered pixels, either the sampling of alternate rows must be altered by the timing controller 88, or that the video processor must compensate for the staggered rows of pixels while manipulating the video data.

Thus, although there has been described to this point a particular embodiment for a method and structure of increasing effective horizontal resolution through staggered pixels, it is not intended that such specific references be considered as limitations upon the scope of this invention except in-so-far as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method for controlling an orthogonal array of spatial light modulator elements, the method comprising the steps of:
    a. grouping said orthogonal spatial light modulator elements into sub-arrays in horizontal rows such that one said sub-array is horizontally between two adjacent sub-arrays in each adjacent row; and
    b. controlling each of said modulator elements in said sub-array such that said modulator elements operate in unison.

2. The method of claim 1 wherein said controlling step comprises individually addressing each element in said sub-array.

3. The method of claim 1 wherein said controlling step comprises addressing each element in said sub-array simultaneously.

4. The method of claim 1 wherein said grouping step comprises forming sub-arrays having a predominately square form factor.

5. The method of claim 1 wherein said grouping step comprises forming sub-arrays consisting of four modulator elements arranged in a 2×2 matrix.

6. The method of claim 1 wherein said spatial light modulator elements are digital micromirror devices.

7. The method of claim 1 wherein said spatial light modulator elements are torsion beam digital micromirror devices.

8. A spatial light modulator comprising:
    a. an orthogonal array of spatial light modulator elements; and
    b. a control circuit for controlling said elements, said control circuit causing sub-arrays of said elements to operate in unison, said sub-arrays arranged in staggered horizontal rows wherein each sub-array is located horizontally between two adjacent sub-arrays in each adjacent row.

9. The modulator of claim 8 wherein said sub-arrays have a predominately square form factor.

10. The modulator of claim 8 wherein said sub-arrays consist of four modulator elements arranged in a 2×2 matrix.

11. The modulator of claim 8 wherein said elements are digital micromirror devices.

12. The modulator of claim 8 wherein said elements are torsion beam digital micromirror devices.

13. The modulator of claim 8 wherein two or more of said control circuits are fabricated for each sub-array.

14. A digital micromirror device comprising:

an orthogonal array of digital micromirror elements, each of said elements comprising a deflectable mirror suspended over an address electrode, said address electrode for receiving a bias voltage, said bias voltage for causing said deflectable mirror element to deflect toward said address electrode;

said elements grouped into sub-arrays comprised of at least two elements, wherein said address electrodes within each sub-array are electrically connected such that said bias voltage causes all deflectable mirror elements within a sub-array to deflect equally; and said array comprised of at least three staggered horizonal rows of said sub-arrays wherein each said sub-array is located horizontally between two adjacent sub-arrays in an adjacent row.

15. The device of claim 14 wherein said digital micromirror elements are torsion beam digital micromirror elements.

16. A digital micromirror device according to claim 14, further comprising:

at least two controlling circuits, each of the controlling circuits alternatively operable for applying a voltage bias signal to the address electrodes associated with each of the digital micromirror elements sub-arrays.

17. A video display system comprising:

a light source for generating a beam of light;

a decoder for downconverting an input composite video signal and outputting an analog baseband video signal;

an analog to digital converter for sampling said analog baseband video signal and outputting a digital representation of said analog baseband video signal;

a video formatter for receiving said digital representation and outputting digital display data; and a digital micromirror device receiving said digital display data and said beam of light, the digital micromirror device generating an image bearing beam of light dependent on said digital display data, wherein said digital micromirror device comprises an orthogonal array of digital micromirror elements and a control circuit for controlling said elements, said control circuit causing sub-arrays of said elements to operate in unison, said sub-arrays arranged in staggered horizontal rows wherein each sub-array is located horizontally between two adjacent sub-arrays in an adjacent row.

18. The display system of claim 17 wherein said video formatter comprises a video processor and a DMD formatter, said video processor receiving said digital representation of said analog baseband video signal and outputting an altered digital video signal, said DMD formatter for receiving said altered digital video signal and outputting said digital display data.

19. The display system of claim 17 further comprising a frame memory for storing said digital display data from said video formatter before said digital display data is displayed by said digital micromirror device.

20. The display system of claim 17 wherein said digital micromirror device is a torsion beam digital micromirror device.

* * * * *